(12) United States Patent
Luo et al.

(10) Patent No.: US 8,971,433 B2
(45) Date of Patent: Mar. 3, 2015

(54) COMPRESSIVE WIRELESS MODULATION

(75) Inventors: Chong Luo, Shanghai (CN); Kun Tan, Beijing (CN); Feng Wu, Beijing (CN); Hao Cui, Hefei Anhui Province (CN); Chang Wen Chen, East Amherst, NY (US)

(73) Assignee: Microsoft Technology Licensing LLC, Redmond, WA (US)

( * ) Notice: Subject to any disclaimer, the term of this patent is extended or adjusted under 35 U.S.C. 154(b) by 648 days.

(21) Appl. No.: 12/945,741

(22) Filed: Nov. 12, 2010

(65) Prior Publication Data

US 2012/0121030 A1  May 17, 2012

(51) Int. Cl.
*H04L 5/12* (2006.01)
*H04L 27/34* (2006.01)
*H04L 1/00* (2006.01)
*H04L 1/18* (2006.01)

(52) U.S. Cl.
CPC .......... *H04L 27/3416* (2013.01); *H04L 1/005* (2013.01); *H04L 1/1812* (2013.01)
USPC .......................................... 375/261; 375/298

(58) Field of Classification Search
CPC ..... H04L 1/003; H04L 1/0009; H04L 1/0041; H04L 1/0057; H04L 25/03343; H03M 13/3761
USPC .................. 375/261, 264, 298, 316
See application file for complete search history.

(56) References Cited

U.S. PATENT DOCUMENTS

| | | | |
|---|---|---|---|
| 5,570,369 A | 10/1996 | Jokinen | |
| 6,185,418 B1 | 2/2001 | MacLellan et al. | |
| 6,892,343 B2 | 5/2005 | Sayood et al. | |
| 6,928,592 B2 | 8/2005 | Barrett | |
| 7,197,690 B2 | 3/2007 | Shen et al. | |
| 7,265,682 B2 | 9/2007 | Memarzadeh et al. | |
| 7,271,747 B2 | 9/2007 | Baraniuk et al. | |
| 7,292,583 B2 | 11/2007 | Schoenblum | |
| 7,447,978 B2 | 11/2008 | Hannuksela | |
| 7,555,064 B2 | 6/2009 | Beadle | |
| 7,672,392 B2 | 3/2010 | Johansson | |
| 7,715,333 B2 | 5/2010 | Binzel et al. | |
| 7,760,699 B1* | 7/2010 | Malik | 370/342 |
| 2007/0223620 A1* | 9/2007 | Kalhan et al. | 375/295 |
| 2010/0100792 A1* | 4/2010 | Abu-Surra | 714/755 |
| 2010/0157901 A1* | 6/2010 | Sanderovitz et al. | 370/328 |
| 2011/0200088 A1* | 8/2011 | Koslov et al. | 375/227 |

(Continued)

FOREIGN PATENT DOCUMENTS

WO   WO2011150315(A2)   12/2011

OTHER PUBLICATIONS

Brown, J. David et al. "Adaptive Demodulation Using Rateless Erasure Codes", Sep. 2006, IEEE Transactions on Communications, vol. 54, No. 9.*

(Continued)

*Primary Examiner* — Shuwang Liu
*Assistant Examiner* — David S Huang
(74) *Attorney, Agent, or Firm* — Dan Choi; Judy Yee; Micky Minhas (57) ABSTRACT

A projection code is applied to encode symbols as weighted arithmetic sums of approximately random subsets of binary source bits. Pairs of the symbols are combined to form constellation points, which are sequentially mapped through a constellation to modulate a data signal.

15 Claims, 8 Drawing Sheets

(56) References Cited

U.S. PATENT DOCUMENTS

2011/0246848 A1* 10/2011 Yue et al. .................. 714/751
2012/0121030 A1    5/2012 Luo et al.

OTHER PUBLICATIONS

Baron, et al., "Bayesian Compressive Sensing via Belief Propagation", retrieved on Aug. 2, 2010 at <<http://arxiv.org/pdf/0812.4627v2>>, IEEE Transactions on Signal Processing, vol. 58, No. 1, Jan. 2010, pp. 269-280.

Berrou, et al., "Near Shannon Limit Error-Correcting Coding and Decoding: Turbo-Codes", retrieved on Aug. 2, 2010 at <<http://www.google.co.in/url?sa=t&source=web&cd=1&ved=0CBUQFjAA&url=http%3A%2F%2Fciteseerxist.psu.edu%2Fviewdoc%2Fdownload%3Fdoi%3D10.1.1.135.9318%26rep%3Drep1%26type%3Dpdf&rct=j&q=.%20Near%20shannon%20limit%20error-correcting%20coding%20and%20decoding&ei=KJIWTNDxJ8n64AbpxPymBQ&usg=AFQjCNG_4vUdVd-A-bwD9-83yM8rWrUe8A>>, IEEE, "Communications", 1993. ICC '93 Geneva. Technical Program, Conference Record, IEEE International Conference on, vol. 2, no., pp. 1604,1070 vol. 2, May 23-26, 1993.

Bicket, "Bit-rate Selection in Wireless Networks", retrieved on Aug. 2, 2010 at <<http://www.comp.nus.edu/~bleong/geographic/related/jbicket-ms-itrate_selection.pdf>>, Massachusetts Institute of Technology, Masters Thesis, Feb. 2005, pp. 1-50.

Brown, et al., "Adaptive Demodulation Using Rateless Erasure Codes", retrieved on Aug. 2, 2010 at <<http://www.dsp.utoronto.ca/~kostas/Publications2008/pub/91.pdf>>, IEEE Transactions on Communications, vol. 54, No. 9, Sep. 2006, pp. 1574-1585.

Caire, et al., "Bit-Interleaved Coded Modulation", retrieved on Aug. 2, 2010 at <<http://ieeexplore.ieee.org/stamp/stamp.jps?tp=&arnumber=669123>>, IEEE Transactions on Information Theory, vol. 4, No. 3, May 1998, pp. 927-946.

Calderbank, "Multilevel Codes and Multistage Decoding", retrieved on Aug. 2, 2010 at <<http://ieeexplore.ieee.org/stamp/stamp.jsp?arnumber=0002095>>, IEEE Transactions on Communications, vol. 37, No. 3, Mar. 1989, pp. 222-229.

Candes, et al., "Robust Uncertainty Principles: Exact Signal Reconstruction from Highly Incomplete Frequency Information", retrieved on Aug. 2, 2010 at <<http://www-stat.stanford.edu/~candes/papers/ExactRecovery.pdf>>, IEEE Transactions on Information Theory, vol. 52, 2006, pp. 489-509.

Donoho, "Compressed Sensing", retrieved on Aug. 2, 2010 at <<http://stat.stanford.edu/~donoho/Reports/2004/CompressedSensing091604.pdf>>, IEEE Transactions on Information Theory, vol. 52, No. 4, Apr. 2006, pp. 1289-1306.

Gallager, "Low-Density Parity-Check Codes", retrieved on Aug. 2, 2010 at <<http://www.rle.mit.edu/rgallager/documents/ldpc.pdf>>, Massachusetts Institute of Technology, PhD Dissertation, Jul. 1963, pp. 1-90.

Holland, et al., "A Rate-Adaptive MAC Protocol for Multi-Hop Wireless Networks", retrieved on Aug. 2, 2010 at <<http://www.ee.oulu.fi/~carlos/papers/MAC/HO01.pdf>>, ACM/IEEE International Conference on Mobile Computing and Networking (MOBICOM), Rome, Italy, Jul. 2001, pp. 1-15.

"IEEE Standard for Information technology—Telecommunications and information exchange between systems—Local and metropolitan area networks—Specific requirements, Part 11: Wireless LAN Medium Access Control (MAC) and Physical Layer (PHY) Specifications", retreived on Aug. 2, 2010 at <<http://standards.ieee.org/getieee802/download/802.11-2007.pdf>>, IEEE Computer Society, IEEE Std 802.11-2007, 2007, pp. 1-1233.

Imai, et al., "A New Multilevel Coding Method Using Error-Correcting Codes", retrieved on Aug. 2, 2010 at <<http://ieeexplore.ieee.org/stamp/stamp.jsp?tp=&arnumber=1055718>>, IEEE Transactions on Information Theory, vol. IT-23, No. 3, 1977, pp. 371-377.

Ji, et al., "Bayesian Compressive Sensing", retrieved on Aug. 2, 2010 at <<http://people.ee.duke.edu/~shji/papers/BCS_preprint.pdf>>, ACM, Proceedings of International Conference on Machine Learning (ICML), Corvalis, Oregon, vol. 227, 2007, pp. 377-384.

Judd, et al., "Efficient Channel-aware Rate Adaptation in Dynamic Environments", retrieved on Aug. 2, 2010 at <<http://www.cse.iitb.ac.in/~victor/seminar/charm.pdf>>, ACM, Proceedings of International Conference on Mobile Systems, Applications and Services (MOBISYS), Breckenridge, Colorado, Jun. 2008, pp. 118-131.

Luby, "LT Codes", retrieved on Aug. 2, 2010 at <<http://www.inference.phy.cam.ac.uk/mackay/dfountain/LT.pdf>>, IEEE Computer Society, Proceedings of Symposium on Foundations of Computer Science (FOCS), 2002, pp. 1-10.

MacKay, et al., "Near Shannon Limit Performance of Low Density Parity Check Codes", retrieved on Aug. 2, 2010 at <<http://eref.uqu.edu.sa/files/Others/Ldpc/LDPC%20Theory/Near%20Shannon%20limit%20performance%20of%20low%20density%20parity%20check%20c.pdf>>, Electronic Letters, vol. 33, No. 6, Mar. 13, 1997, pp. 457-458.

Martinez, et al., "Bit-Interleaved Coded Modulation Revisited: A Mismatched Decoding Perspective", retrieved on Aug. 2, 2010 at <<http://oai.cwi.nl/oai/asset/14635/14635B.pdf>>, IEEE Transactions on Information Theory, vol. 55, No. 6, Jun. 2009, pp. 2756-2765.

Pretti, "A message-passing algorithm with damping", retrieved on Aug. 2, 2010 at <<http://iopscience.iop.org/1742-5468/2005/11/P11008/pdf/jstat5_11_p11008.pdf>>, IOP Publishing, Journal of Statistical Mechanics: Theory and Experiment, Nov. 2005, pp. 1-16.

Sarvotham, et al., "Measurements vs. Bits: Compressed Sensing meets Information Theory", retrieved on Aug. 2, 2010 at <<http://dsp.rice.edu/sites/dsp.rice.edu/files/publications/conference-paper/2006/mvb-acccc-2006$_{13}$ 0.pdf>>, Proceedings of Allerton Conference on Communication, Control and Computing, Monticello, IL, Sep. 2006, pp. 1-5.

Sarvotham, et al., "Sudocodes—Fast Measurement and Reconstruction of Sparse Signals", retrieved on Aug. 2, 2010 at <<http://citeseerx.ist.psu.edu/viewdoc/download?doi=10.1.1.119.9121&rep=rep1&type=pdf>>, IEEE International Symposium on Information Theory (ISIT), Seattle, WA, Jul. 2006, pp. 1-5.

Schniter, et al., "Fast Bayesian Matching Pursuit: Model Uncertainty and Parameter Estimation for Sparse Linear Models", retrieved on Aug. 2, 2010 at <<http://www2.ece.ohio-state.edu/~zinielj/FBMP_TransSP.pdf>>, IEEE Transactions on Signal Processing, Mar. 2009, pp. 1-29.

Seeger, et al., "Compressed Sensing and Bayesian Experimental Design", retrieved on Aug. 2, 2010 at <<http://icml2008.cs.helsinki.fi/papers/459.pdf>>, ACM, Proceedings of International Conference on Machine Learning (ICML), Helsinki, Finland, vol. 307, 2008, pp. 912-919.

Shokrollahi, "Raptor Codes", retrieved on Aug. 2, 2010 at <<http://www.inference.phy.cam.ac.uk/mackay/dfountain/RaptorPaper.pdf>>, IEEE Transactions on Information Theory, vol. 52, No. 6, Jun. 2006, pp. 2551-2567.

Tan, et al., "Sora: High Performance Software Radio Using General Purpose Multi-core Processors", retrieved on Aug. 2, 2010 at <<http://citeseerx.ist.psu.edu/viewdoc/download?doi=10.1.1.148.4181&rep=rep1&type=pdf>>, USENIX Association, Symposium on Networked Systems Design and Implementation (NSDI), 2009, pp. 75-90.

Ungerboeck, "Channel Coding with Multilevel/Phase Signals", retrieved on Aug. 3, 2010 at <<http://ieeexplore.ieee.org/stamp/stamp.jsp?tp=&arnumber=1056454>>, IEEE Transactions on Information Theory, vol. IT-28, No. 1, Jan. 1982, pp. 1-13.

Vutukuru, et al., "Cross-Layer Wireless Bit Rate Adaptation", retrieved on Aug. 2, 2010 at <<http://www.stanford.edu/class/cs244e/papers/softrate.pdf>>, ACM SIGCOMM Computer Communication Review, vol. 39, No. 4, 2009, pp. 3-14.

Wachsmann, et al., "Multilevel Codes:Theoretical Concepts and Practical Design Rules", retrieved on Aug. 2, 2010 at <<http://www.ensc.sfu.ca/people/faculty/cavers/ENSC805/readings/45it05-wachsmann.pdf>>, IEEE Transactions on Information Theory, vol. 45, No. 5, Jul. 1999, pp. 1361-1391.

Wong, et al., "Robust Rate Adaptation for 802.11 Wireless Networks", retrieved on Aug. 2, 2010 at <<http://citeseerx.ist.psu.edu/viewdoc/download?doi=10.1.1.87.4525&rep=rep1&type=pdf>>, (56) References Cited

OTHER PUBLICATIONS

ACM, Proceedings of International Conference on Mobile Computing and Networking (MOBCOM), Los Angeles, California, Sep. 2006, pp. 146-157.

Wu, et al., "Analysis on Rate-distortion Performance of Compressive Sensing for Binary Sparse Source", retrieved on Aug. 2, 2010 at <<http://74.125.155.132/scholar?q=cache:duOSbgC8dplJ:scholar.google.com/&hl=en&as_sdt=2000>>, IEEE Data Compression Conference, 2009, pp. 113-122.

Zehavi, "8-PSK Trellis Codes for a Rayleigh Channel", retrieved on Aug. 2, 2010 at <<http://www.site.uottawa.ca/~yongacog/courses/achannelcoding/zeh.pdf>>, IEEE Transactions on Communications, vol. 40, No. 5, May 1992, pp. 873-884.

Aditya, et al., "Flexcast: Graceful Wireless Video Streaming", In Proceedings of the 17th Annual International Conference on Mobile Computing and Networking, Sep. 19, 2011, 12 pages.

Ardakani, Masoud, "Efficient Analysis, Design and Decoding of Low-Density Parity-Check Codes", A Thesis Submitted in Conformity with the Requirements for the Degree of Doctor of Philosophy, Jul. 4, 2013, 164 pages.

Arslan, et al., "Generalized Unequal Error Protection LT Codes for Progressive Data Transmission", In IEEE Transactions on Image Processing, vol. 21, Issue 8, Aug. 2012, 12 pages.

Bajwa, et al., "Joint Source-Channel Communication for Distributed Estimation in Sensor Networks", In IEEE Transactions on Information Theory, vol. 53, Issue 10, Oct. 2007, 25 pages.

Blumensath, et al., "Iterative Hard Thresholding for Compressed Sensing", In Proceedings of Applied and Computational Harmonic Analysis, vol. 27, Issue 3, Nov. 2009, 27 pages.

Brink, Stephan Ten, "Convergence Behavior of Iteratively Decoded Parallel Concatenated Codes", In IEEE Transactions on Communications, vol. 49, Issue 10, Oct. 2001, 11 pages.

Brink, et al., "Design of Low-Density Parity-Check Codes for Modulation and Detection", In IEEE Transactions on Communications, vol. 52, Issue 4, Apr. 2004, 9 pages.

Bursalioglu, et al., "Joint Source-Channel Coding for Deep Space Image Transmission Using Rateless Codes", In Information Theory and Applications Workshop, Feb. 6, 2011, 10 pages.

Cabarcas, et al., "Turbo Coding of Strongly Nonuniform Memoryless Sources with Unequal Energy Allocation and Pam Signaling", In IEEE Transactions on Signal Processing, vol. 54, Issue 5, May, 2006, 5 pages.

Caire, et al., "A New Data Compression Algorithm for Sources with Memory Based on Error Correcting Codes", In IEEE Information Theory Workshop, Mar. 31, 2003, 5 pages.

Caire, et al., "Fountain Codes for Lossless Data Compression", In Proceedings of DIMACS Series in Discrete Mathematics and Theoretical Computer Science, Dec. 2005, 19 pages.

Candes, Emamnuel J., "Compressive Sampling", In Proceedings of the International Congress of Mathematicians, Aug. 22, 2006, 20 pages.

Ceire, et al., "Universal Variable-Length Data Compression of Binary Sources using Fountain Codes", In IEEE Transactions on Information Theory, Oct. 24, 2004, 6 pages.

Chen, et al., "Energy-Aware Design of Compressed Sensing Systems for Wireless Sensors Under Performance and Reliability Constraints", In IEEE Transactions on Circuits and Systems I: Regular Papers, vol. 60, Issue 3, Mar. 2013, 12 pages.

Chen, et al., "Reduced-Complexity Decoding of LDPC Codes", In IEEE Transactions on Communications, vol. 53, Issue 8, Aug. 2005, 12 pages.

Cui, et al., "Seamless Rate Adaptation for Wireless Networking", In Proceedings of the 14th ACM International Conference on Modeling, Analysis and Simulation of Wireless and Mobile Systems, Oct. 31, 2011, 9 pages.

Dai, et al., "Subspace Pursuit for Compressive Sensing Signal Reconstruction", In IEEE Transactions on Information Theory, vol. 55, Issue 5, May 2009, 20 pages.

Donoho, et al., "Fast Solution of 1 -Norm Minimization Problems When the Solution May be Sparse", In IEEE Transactions on Information Theory, vol. 54, Issue 11, Nov. 2008, 45 pages.

Duarte, et al., "Universal Distributed Sensing Via Random Projections", In Proceedings of the 5th International Conference on Information Processing in Sensor Networks, Apr. 19, 2006, 9 pages.

Feizi, et al., "A Power Efficient Sensing/Communication Scheme: Joint Source-Channel-Network Coding by Using Compressive Sensing", In Proceedings of 49th Annual Allerton Conference on Communication, Control, and Computing, Sep. 28, 2011, 7 pages.

Feizi, et al., "Compressive Sensing Over Networks", In Proceedings of 48th Annual Allerton Conference on Communication, Control, and Computing, Sep. 29, 2010, 8 pages.

Fresia, et al., "Optimized Concatenated LDPC Codes for Joint Source-Channel Coding", In IEEE International Symposium on Information Theory, vol. 3, Jun. 28, 2009, 5 pages.

Gorgoglione, Matteo, "Analysis and Construction of Non-Binary LDPC Codes for Fading Channels", In PHD Thesis, Oct. 25, 2012, 161 pages.

Gudipati, et al., "Strider: Automatic Rate Adaptation and Collision Handling", In Proceedings of the ACM SIGCOMM Conference, Aug. 15, 2011, 12 pages.

Hamzaoui, et al., "Optimized Error Protection of Scalable Image Bit Streams [Advances in Joint Source-Channel Coding of Images]", In IEEE of Signal Processing Magazine, vol. 22, Issue 6, Nov. 2005, 17 pages.

He, et al., "Joint Source Channel Rate-Distortion Analysis for Adaptive Mode Selection and Rate Control in Wireless Video Coding", In IEEE Transactions on Circuits and Systems for Video Technology, vol. 12, Issue 6, Jun. 2002, 13 pages.

Jakubczak, et al., "A Cross-Layer Design for Scalable Mobile Video", In Proceedings of the 17th Annual International Conference on Mobile Computing and Networking, Sep. 19, 2011, 13 pages.

Kim, et al., "Optimal Rate Adaptation for Hybrid ARQ in Time-Correlated Rayleigh Fading Channels", In IEEE Transactions on Wireless Communications, vol. 10, Issue 3, Mar. 2011, 12 pages.

Kondi, et al., "Joint Source-Channel Coding for Motion-Compensated DCT-Based SNR Scalable Video", In IEEE Transactions on Image Processing, vol. 11, Issue 9, Sep. 2002, 10 pages.

Liu, et al., "Formulating Binary Compressive Sensing Decoding with Asymmetrical Property", In Proceedings of the Data Compression Conference, Mar. 29, 2011, 10 pages.

Liveris, et al., "Compression of Binary Sources with Side Information at the Decoder using LDPC Codes", In IEEE Communications Letters, vol. 6, Issue 10, Oct. 2002, 3 pages.

Nana, et al., "Improved Decoding of LDPC Coded Modulations", In IEEE Communications Letters, vol. 10, Issue 5, May 2006, 3 pages.

Nanda, et al., "Adaptation Techniques in Wireless Packet Data Services", In IEEE on Communications Magazine, vol. 38, Issue 1, Jan. 2000, 11 pages.

Pan, et al., "Combined Source and Channel Coding with JPEG2000 and Rate-Compatible Low-Density Parity-Check Codes", In IEEE Transactions on Signal Processing, vol. 54, Issue 3, Mar. 2006, 5 pages.

Perry, et al., "Rateless Spinal Codes", In Proceedings of the 10th ACM Workshop on Hot Topics in Networks, Nov. 14, 2011, 6 pages.

Pusane, et al., "Reduced Complexity Decoding Strategies for LDPC Convolutional Codes", In Proceedings of the International Symposium on Information Theory, Jun. 27, 2004, 1 page.

Rowitch, et al., "On the Performance of Hybrid FEC/ARQ Systems using Rate Compatible Punctured Turbo (RCPT) Codes", In IEEE Transactions on Communications, vol. 48, Issue 6, Jun. 2000, 12 pages.

Sartipi, et al., "Source and Channel Coding in Wireless Sensor Networks using LDPC Codes", In IEEE Communications Society Conference on Sensor and Ad Hoc Communications and Networks, Oct. 4, 2004, 8 pages.

Schenka, et al., "Performance Estimation of Bit-Interleaved Coded Modulation Based on Information Processing Characteristics", In IEEE International Symposium on Information Theory Proceedings, Jul. 1, 2012, 5 pages.

(56) References Cited

OTHER PUBLICATIONS

Ser, et al., "Joint Source-Channel Coding of Sources with Memory Using Turbo Codes and the Burrows-Wheeler Transform", In IEEE Transactions on Communications, vol. 58, Issue 7, Jul. 2010, 9 pages.
Soijanin, et al., "Punctured vs Rateless Codes for Hybrid ARQ", In IEEE on Information Theory Workshop, Mar. 13, 2006, 5 pages.
Song, et al., "Threshold Optimization for Rate Adaptation Algorithms in IEEE 802.11 WLANS", In IEEE Transactions on Wireless Communications, vol. 9, Issue 1, Jan. 2010, 10 pages.
Tropp, et al., "Signal Recovery from Random Measurements via Orthogonal Matching Pursuit", In IEEE Transactions on Information Theory, vol. 53, Issue 12, Dec. 2007, 12 pages.
Wang, et al., "Fast Decoding and Hardware Design for Binary-Input Compressive Sensing", In IEEE Journal on Emerging and Selected Topics in Circuits and Systems, vol. 2, Issue 3, Sep. 2012, 13 pages.
Wang, et al., "Improved Decoding Algorithm of Bit-Interleaved Coded Modulation for LDPC Code", In IEEE Transactions on Broadcasting, vol. 56, Issue 1, Mar. 2010, 7 pages.
Xia, et al., "Smart Sender: A Practical Rate Adaptation Algorithm for Multirate IEEE 802.11 WLANS", In IEEE Transactions on Wireless Communications, vol. 7, Issue 5, May, 2008, 12 pages.
Xu, et al., "Distributed Joint Source-Channel Coding of Video Using Raptor Codes", In IEEE Journal on Selected Areas in Communications, vol. 25, Issue 4, May, 2007, 11 pages.
Zhang, et al., "A Power-Optimized Joint Source Channel Coding for Scalable Video Streaming Over Wireless Channel", In IEEE International Symposium on Circuits and Systems, vol. 5, May 6, 2001, 4 pages.
Zhong, et al., "LDGM Codes for Channel Coding and Joint Source-Channel Coding of Correlated Sources", In Journal of EURASIP on Applied Signal Processing, Jan. 2005, 12 pages.
Zhu, et al., "Turbo Codes for Nonuniform Memoryless Sources Over Noisy Channels", In IEEE Communications Letters, vol. 6, Issue 2, Feb. 2002, 3 pages.
Wikipedia, "Raptor Code", retrieved Apr. 1, 2014 from https://en.wikipedia.org/wiki/Raptor_codes, 3 pgs.

\* cited by examiner

$M \times N$ PROJECTION CODING MATRIX $N \times 1$ SOURCE MATRIX $$\begin{bmatrix} 0 & \ldots & W_1 & \ldots & 0 & \ldots & W_L \\ 0 & \ldots & W_1 & \ldots & W_L & \ldots & 0 \\ 0 & \ldots & W_1 & \ldots & W_L & \ldots & 0 \\ 0 & \ldots & W_1 & \ldots & W_L & \ldots & 0 \\ 0 & \ldots & W_1 & \ldots & W_L & \ldots & 0 \\ 0 & \ldots & W_1 & \ldots & W_L & \ldots & 0 \\ 0 & \ldots & W_1 & \ldots & W_L & \ldots & 0 \\ 0 & \ldots & W_1 & \ldots & W_L & \ldots & 0 \\ & & & \ldots & & & \\ 0 & \ldots & W_1 & \ldots & 0 & \ldots & W_L \end{bmatrix} \begin{bmatrix} 0 \\ 1 \\ 0 \\ 0 \\ 1 \\ 0 \\ 1 \\ 1 \\ \ldots \\ B_N \end{bmatrix}$$

COMPRESSIVE WIRELESS MODULATION

BACKGROUND

In digital wireless communication systems, wireless link adaptation is an important process for selecting coding and modulation schemes based on varying channel conditions. For example, if the channel conditions are good (e.g., the sending device and the receiving device are located in close proximity to one another and there is little or no interference), then a coding and modulation scheme that includes only a small amount of redundant data may be selected. In contrast, if the channel conditions are bad (e.g., there is significant interference), then a coding and modulation scheme may be selected that includes a larger amount of redundant data to assist the receiving device in decoding data that is received.

In many existing systems, a sending device uses a particular coding and modulation scheme, transmits data to a receiving device, and awaits feedback from the receiving device. Based on the received feedback, which represents current channel conditions, the sending device may select a different coding and/or modulation scheme to better suit the current channel conditions. Selecting a coding and modulation scheme based on feedback from the receiving device can result in a mismatch between the current channel conditions and the selected coding and modulation scheme. For example, the channel conditions may change more quickly than is reflected by the received feedback.

SUMMARY

This document describes compressive wireless modulation. In one aspect, a projection code is applied to a set of binary source bits to generate rateless multilevel symbols. Each rateless multilevel symbol is a weighted arithmetic sum of a subset of binary source bits. The symbols are then combined to form constellation points that are sequentially mapped through a QAM constellation to modulate a data signal.

The modulated data signal is transmitted over a wireless network from a transmitting device to a receiving device. The receiving device demodulates the received data signal, identifying a plurality of received symbols. The received symbols may differ from the encoded rateless multilevel symbols due to channel noise on the wireless network.

The receiving device iteratively analyzes the received symbols according to a belief propagation algorithm using statistics derived from the same projection code that was used to encode the original binary source bits. Upon successful demodulation and decoding, the receiving device sends an acknowledgment to the transmitting device signaling the transmitting device to cease encoding, modulation and transmission for the current set of binary source bits.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Quadrature amplitude modulation (QAM) is used extensively as a modulation scheme for digital telecommunication systems. In a digital environment, QAM is a modulation scheme in which two digital bit streams are conveyed by changing the amplitudes of two carrier waves using the amplitude-shift keying (ASK) digital modulation scheme and summing the two modulated waves. A constellation diagram is a two-dimensional grid that provides a useful representation of the QAM scheme. The more points represented in the constellation, the more bits can be transmitted per symbol. However, having more points in the constellation also requires that the points be closer together, and makes the modulation scheme more susceptible to noise.

In wireless network environments, channel quality can vary significantly over short periods of time. The quantity and quality of data being transmitted over a wireless link is affected by the efficiency with which the wireless link is adapted based on the channel quality. For example, if the channel quality is good, a larger QAM constellation can be used, resulting in greater throughput, without causing significant data quality degradation. In contrast, if the channel quality is poor, it is advantageous to use a smaller QAM constellation, and thus small throughput, to minimize the effect of the channel noise on the decoding process.

Existing wireless network environments rely on a feedback loop between the sender and the receiver whereby the receiver notifies the sender of the current channel conditions, and the receiver then adapts the constellation being used based on channel conditions as reported by the sender. However, relying on feedback from the receiver introduces a degree of latency, and because the channel conditions can change very quickly, the channel conditions reported by the receiver may not still be the channel conditions after the sender adapts the wireless link based on the feedback.

Compressive wireless modulation, as described herein, provides smooth wireless link adaptation without channel feedback. In embodiments described herein, a projection coding scheme that is approximately random is used to provide redundancy, and a uniform QAM constellation is used regardless of channel conditions. As a result, data transmission occurs more efficiently because the transmitting device does not make any adjustments due to channel conditions. Rather, the receiving device determines when the transmitting device has transmitted a sufficient amount of data, which will vary based on the channel conditions. That is, for a given set of input bits being transmitted, multiple symbols are transmitted. When the receiving device is able to successfully decode the symbols, the receiving device sends an acknowledgment to the transmitting device, indicating that the data has been successfully received and decoded. If the channel conditions are favorable, less data will be needed by the receiving device to properly decode the input bits. On the other hand, if the channel conditions are less favorable (e.g., more noise is introduced), then more data will be needed by the receiving device to properly decode the input bits.

Example Environment

Figure 1:
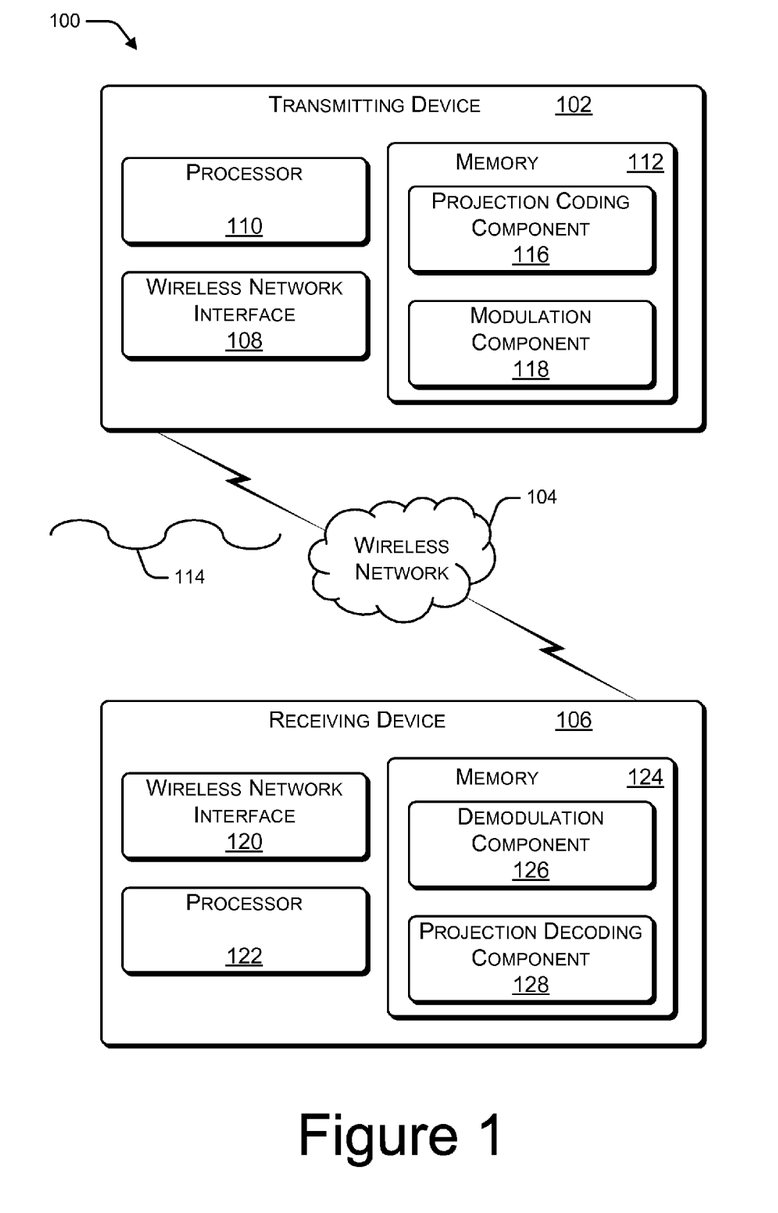
FIG. 1 is a block diagram of an example environment in which compressive wireless modulation may be implemented.

FIG. 1 illustrates an example environment 100 usable to implement compressive modulation. Example environment 100 includes a transmitting device 102, a wireless network 104, and a receiving device 106. Each of the transmitting device 102 and the receiving device 106 may be implemented in many forms, including, but not limited to, a personal computer, a mobile computing device, router, or any other type of digital device configured to communicate over wireless network 104.

Transmitting device 102 includes a wireless network interface 108, a processor 110, and a memory 112. Wireless network interface 108 enables transmitting device 102 to transmit a modulated data signal 114 over wireless network 104 to a receiving device 106. Although not shown in FIG. 1, an operating system and one or more applications may be stored in memory 112 for execution by processor 110. A projection coding component 116 and a modulation component 118 are also stored in memory and executed by processor 110.

Projection coding component 116 encodes binary information bits using a weighted arithmetic addition operation to create non-binary, multi-level rateless symbols. Modulation component 118 performs a sequential mapping of the multi-level rateless symbols using a dense constellation (e.g., a 23×23 QAM), to generate the modulated data signal 114.

Receiving device 106 includes a wireless network interface 120, a processor 122, and a memory 124. Wireless network interface 120 enables receiving device 106 to receive a modulated data signal 114 over wireless network 104.

Although not shown in FIG. 1, an operating system and one or more applications may be stored in memory 124 and executed on processor 122. Receiving device 106 also includes a demodulation component 126 and a projection decoding component 128, each stored in memory 124 and executed on processor 122.

Demodulation component 126 receives the modulated data signal 114 over wireless network 104, and demodulates the received signal, resulting in multi-level rateless symbols. The symbols determined by demodulation component 126 will vary from the originally encoded symbols based on the channel quality of the wireless network 104 over which the modulated data signal was transmitted.

Projection decoding component 128 utilizes statistics of channel noise through belief propagation to decode the received, demodulated symbols. The production decoding is an iterative process, with the number of iterations depending on the channel quality. The better the channel quality, the fewer iterations, and fewer symbols, are needed to successfully obtain the original binary information bits.

Although illustrated in FIG. 1 as being stored in memory 112 of transmitting device 102, projection coding component 116 and/or modulation component 118, or portions thereof, may be implemented using any form of computer-readable media that is accessible by transmitting device 102. Similarly, demodulation component 126 and/or projection decoding component 128, or portions thereof, may be implemented using any form of computer-readable media that is accessible by receiving device 106.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Coding and Modulation

Figure 2:
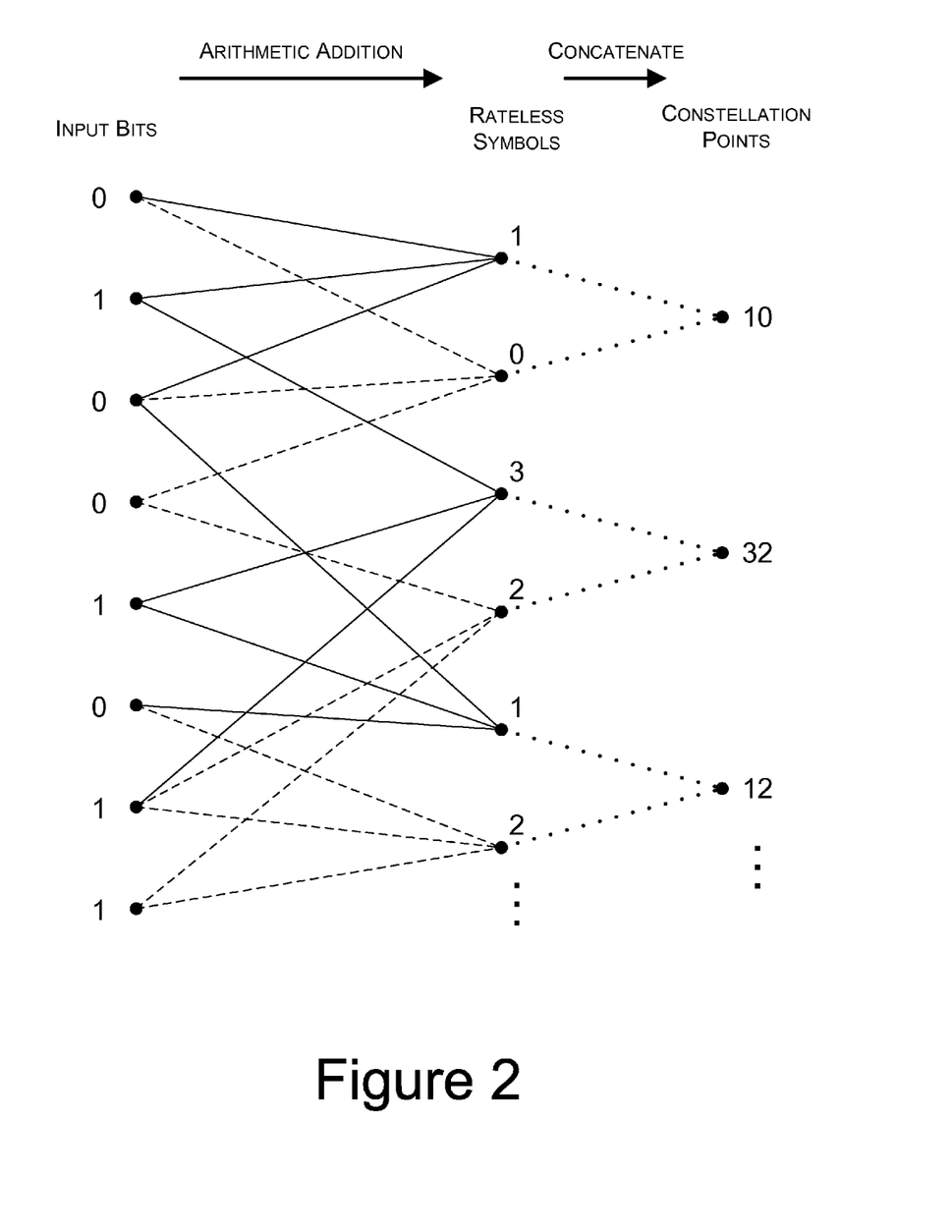
FIG. 2 is a symbolic diagram of projection coding applied to an example set of binary input bits.

FIG. 2 illustrates projection coding of an example set of binary input bits. As discussed above with reference to FIG. 1, a projection coding component 116 encodes binary information bits using a weighted arithmetic addition operation to create non-binary, multi-level rateless symbols. FIG. 2 illustrates an example in which the weights are each set to a value of 1, so the operation is effectively a non-weighted arithmetic addition operation.

In FIG. 2, the input bits are 01001011, and are shown in a column down the left side of the FIG. 2. In this example, the input bits are combined in approximately random groups of three to generate a rateless symbol. For example, the first three bits (010) are arithmetically added together (0+1+0=1) to generate the first symbol, "1". The solid lines between the first three input bits and first symbol indicate that the first symbol is generated from the arithmetic addition of these first three input bits.

Similarly, dashed lines indicate that the second symbol, "0" is generated from the arithmetic addition of the first, third, and fourth input bits (0+0+0=0). The second, fifth, and seventh input bits (1, 1, and 1) are combined to generate the third symbol, "3", and so on.

The number of rateless symbols that can be generated from the input bits depends on the total number of input bits being encoded and the number of bits being combined to form each measurement. In the described example, each rateless symbol is generated from an approximately random subset of the input bits. In alternate implementations, any number of techniques may be utilized to select and combine input bits to generate the rateless symbols.

Pairs of symbols are then concatenated to form points that are to be mapped to a quadrature amplitude modulation (QAM) constellation. In the illustrated example, the first two symbols are concatenated to form the constellation point "10". Similarly, the third and fourth symbols are concatenated to form the constellation point "32", and the fifth and sixth symbols are concatenated to form the constellation point "12".

Figure 3:
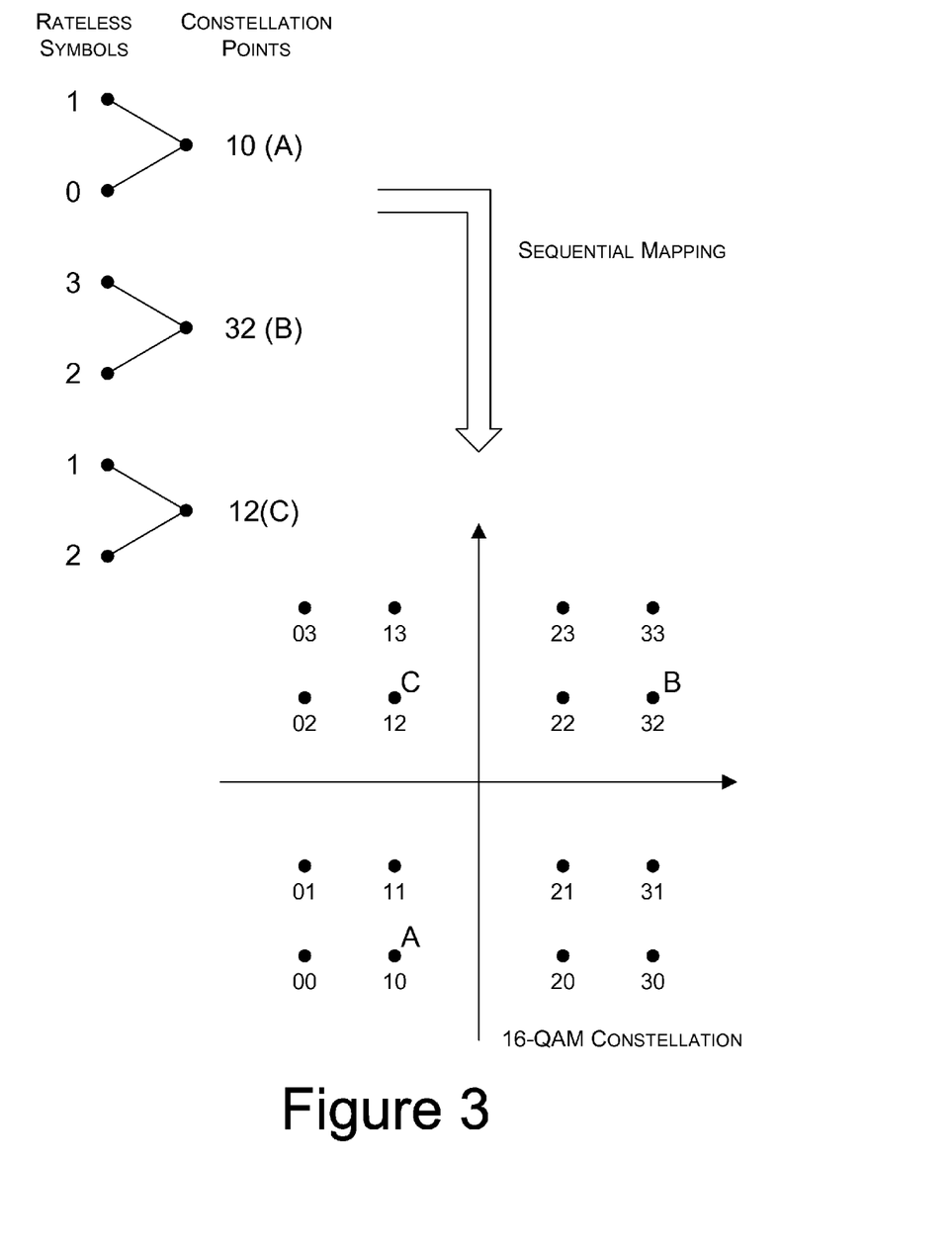
FIG. 3 is a symbolic diagram of example rateless symbols sequentially mapped through a QAM constellation.

FIG. 3 illustrates sequential mapping of rateless symbols through a QAM constellation. The symbols that were concatenated to form the constellation points illustrated in FIG. 2 are shown down the left side of FIG. 3.

In this example, because three binary input values are combined to form each symbol, each symbol has a value of 0, 1, 2, or 3. Therefore, because two symbols are concatenated to form each constellation point, each constellation point has a value between 00 and 33. FIG. 3 illustrates a 16-QAM constellation that includes each constellation point that can be generated from the example input bits and weight values. The symbols are mapped to the square QAM constellation using Gray code such that the first digit of the constellation points increases sequentially in each row from left to right, and the second digit of the constellation points increases sequentially in each column from bottom to top. The three example constellation points are designated "A", "B", and "C", and are shown as such on the 16-QAM constellation in FIG. 3.

Figure 4:
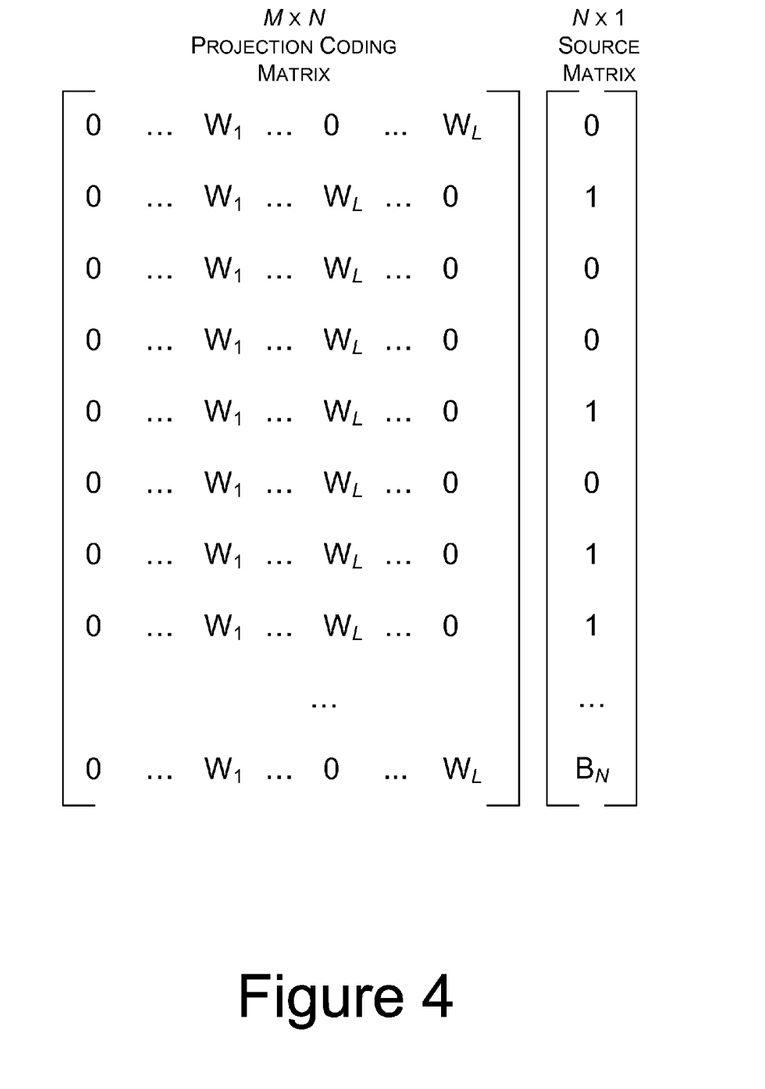
FIG. 4 is a symbolic diagram of an example matrix representation of a projection code to encode input binary bits using weight values to generate multi-level rateless symbols.

FIGS. 2 and 3 provide a simplistic example of how multi-level rateless symbols are generated and mapped to a QAM constellation. As described above with reference to FIG. 2, in the illustrated example, the weights used in the arithmetic addition operation were all set to a value of "1". FIG. 4 illustrates a matrix representation of weight values and input binary bits that may be used by projection coding component 116 to generate multi-level rateless symbols.

In an example implementation, the source bits to be transmitted are divided into frames, with each frame having a length denoted by N. Depending on the specific implementation, a frame may have a length of, for example, 100, 400, 500, etc. As illustrated in FIG. 4, the source bits $B_1, B_2, \ldots, B_N$ for a particular frame are arranged as a column to form an N×1 source matrix.

A set of weight values is identified and used to form a low-density projection coding N×M matrix, where M represents a number of symbols to be generated from the frame of source bits. The set of weight values may take any of a variety of forms. For example, any number of weight values may be used. The number of weight values used determines the number of source bits that are combined to form each symbol. For example, if three weight values are used, then three source bits will be combined to form each symbol. Similarly, if seven weight values are used, then seven source bits will be combined to form each symbol.

The values of the selected weight values determine the size of the QAM constellation that will be used to map the generated symbols. For example, if the set of weight values is {1, 2, 4}, then each symbol will have a value in the set {0, 1, 2, 3, 4, 5, 6, 7}. As a result, a 64-QAM constellation will be used to map the generated symbols.

The selected weights may be integer or floating point numbers, and may be symmetric or non-symmetric. Symmetric weight sets include positive weight values, and corresponding negative weight values. As an example, the weight set {1, 2, 4} is a non-symmetric, integer set of weights. As another example, the weight set {−4, −2, −1, 1, 2, 4} is a symmetric, integer set of weights. Other example symmetric weight sets include {−2, −2, −1, −1, −1, 1, 1, 1, 2, 2} and {−4, −4, −2, −1, 1, 2, 4, 4}.

Referring back to FIG. 4, the projection coding matrix is constructed with M rows, each with N values. The values in each row are all zeros, except for the weight values. For example, if the weight set is $\{W_1, W_2, \ldots, W_L\}$, then the values $W_1, W_2, \ldots, W_L$ will be found in each row of the projection coding matrix, with each other value in each row being zero, such that a symbol generated from any given row of the projection coding matrix represents a weighted addition of L source bits. The weight values are distributed in the rows of the projection coding matrix such that multiplying the M×N matrix by the N×1 matrix generates M symbols, each based on a different weighted combination of L source bits. Both the order and the position of the L weight values in the rows of the projection coding matrix vary from one row to another, resulting in approximately random combinations of source bits.

Figure 5:
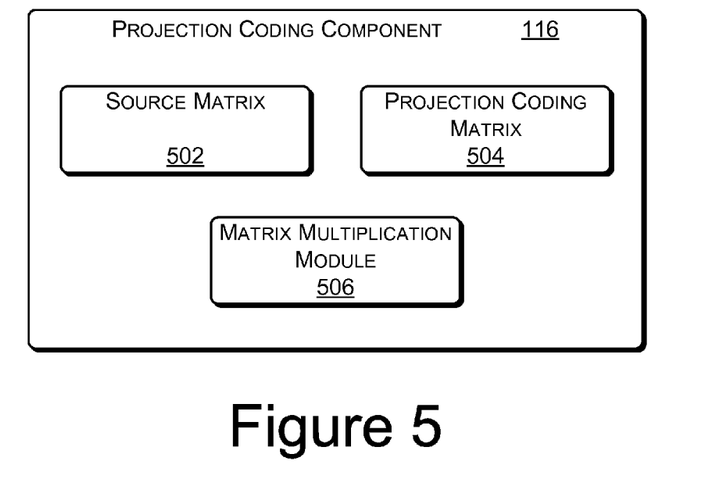
FIG. 5 is a block diagram that illustrates modules of an example projection coding component.

FIG. 5 illustrates example modules of projection coding component 116 including a source matrix 502, a projection coding matrix 504, and a matrix multiplication module 506. Source matrix 502 is a matrix of source bits. Projection coding matrix 504 is a large, low-density matrix with a set of weight values distributed in each row. Matrix multiplication module 506 is configured to multiply projection coding matrix 504 by source matrix 502 to generate a series of symbols.

Figure 6:
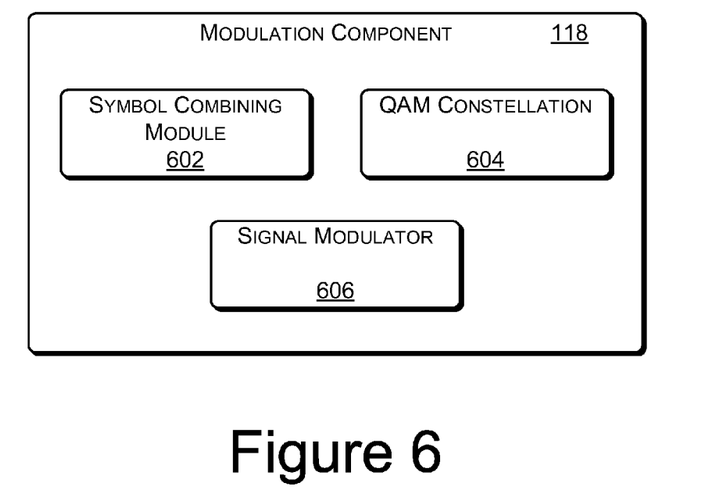
FIG. 6 is a block diagram that illustrates modules of an example modulation component.

FIG. 6 illustrates example modules of modulation component 118. Symbol combining module 602 is configured to combine symbols generated from projection coding component 116 to form constellation points. QAM constellation 604 is a two-dimensional map of the possible symbol pair values that may be generated by symbol combining module 602. As described above, the size of the QAM constellation 604 depends on the selected weight values. Signal modulator 606 modulates the generated rateless multilevel symbols to channel dimensions, generating a modulated data signal.

Figure 7:
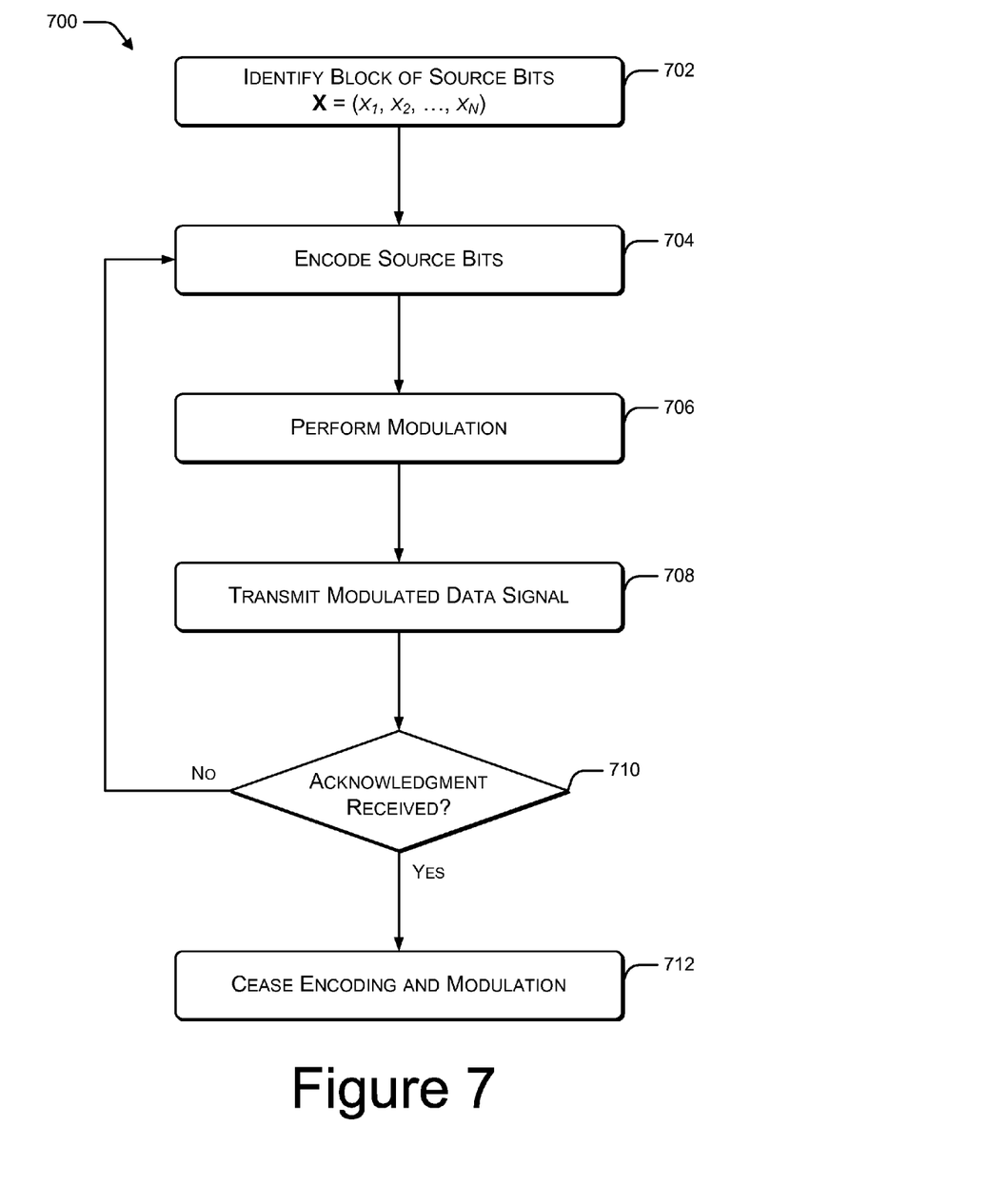
FIG. 7 is a flow diagram of an example process for data coding and modulation.

FIG. 7 is a flow diagram of an example process for data coding and modulation. This process is illustrated as a collection of blocks in a logical flow graph, which represents a sequence of operations that can be implemented in hardware, software, or a combination thereof. In the context of software, the blocks represent computer-executable instructions stored on one or more computer storage media that, when executed by one or more processors, cause the processors to perform the recited operations. Note that the order in which the process is described is not a limitation, and any number of the described process blocks can be combined in any order to implement the process, or alternate processes. Additionally, individual blocks may be deleted from the processes without departing from the spirit and scope of the subject matter described herein. Furthermore, while this process is described with reference to the transmitting device 102 of FIG. 1, other computer architectures may implement one or more portions of this process, in whole or in part.

FIG. 7 illustrates an example process 700 for coding and modulation of binary source data.

At block 702, a block of source bits, x, is identified, where $x=(x_1, x_2, \ldots, x_N)$. For example, projection coding component 116 receives binary source data to be transmitted.

At block 704, projection coding component 116 encodes the identified source bits into a series of symbols $(s_1, s_2, \ldots)$ by projection, $s_i = c_i \cdot x^T$, where $c_i$ is a low-density vector. As described above with reference to FIG. 4, L entries in $c_i$ are non-zero and they take values from a weight set $\{w_1, w_2, \ldots, w_L\}$. The position of the non-zero entry in $c_i$ that takes weight $w_l$ can be denoted by $i_l$ ($l=1, 2, \ldots, L$). In input vector x, only the entries at corresponding positions are sampled, so projection $s_i$ can also be denoted as:

$$s_i = \sum_{l=1}^{L} w_l \cdot x_{i_l}$$

A number of projections are applied to the block of source bits to generate multiple symbols to be transmitted. The projections $s_i$ generate multi-level values through arithmetic weighted sums, creating a finite alphabet, $S=\{\Sigma_{l\in\Lambda}w_l|\Lambda\underline{\cup}\{1, 2, \ldots, L\}\}$.

In this alphabet, the minimum and maximum values are $s_{min}=\Sigma_{w_l<0}w_l$ and $s_{max}=\Sigma_{w_l>0}w_l$.

At block 706, modulation component 118 performs modulation of the symbols encoded from the source bits to generate the modulated data signal for transmission over wireless network 104. For example, as described above with reference to FIG. 3, the symbols are mapped, in pairs, onto a QAM constellation. The size of the QAM constellation is based on minimum and maximum values of alphabet, S, defined above.

In an example implementation, the symbol values are sequentially and evenly mapped to modulated parameters of each channel dimension. In amplitude modulation, the mapping is from $[s_{min}, s_{max}]$ to $[-A, A]$, where A represents the maximum amplitude in use. Therefore, the actual amplitude $a_i$, used to transmit symbol $s_i$ is given by:

$$a_i = -A + \frac{2A}{s_{max} - s_{min}}(s_i - s_{min})$$

At block 708, the modulated data signal is transmitted over the wireless network. For example the modulated data signal is sent from modulation component 118, through the wireless network interface 108, over the wireless network 104.

At block 710, the transmitting device determines whether or not an acknowledgment has been received. For example, as described above with reference to FIG. 1, the receiving device sends an acknowledgement when the receiving device has been able to successfully decode the transmitted data. If no acknowledgment has been received (the "No" branch from block 710), then processing continues as described above with reference to block 704, with a different projection being applied to the block of source bits.

If, at block 710, an acknowledgement has been received (the "Yes" branch from block 710), then at block 712, the transmitting device ceases the encoding and modulation of the source bits.

Example Demodulation and Decoding

Figure 8:
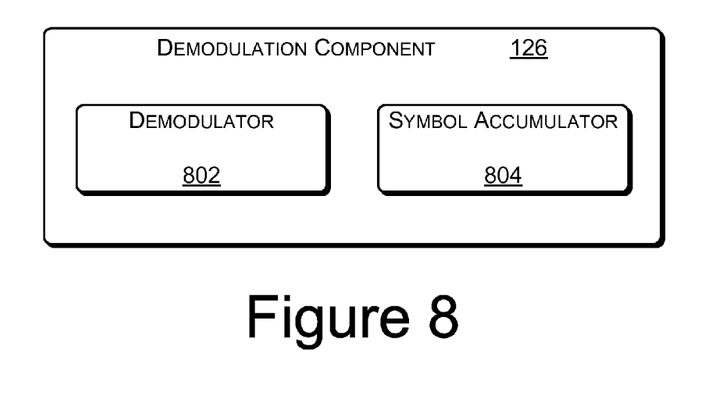
FIG. 8 is a block diagram that illustrates modules of an example demodulation component.

FIG. 8 illustrates example modules of demodulation component 126 including demodulator 802 and symbol accumulator 804.

Demodulator 802 demodulates a received signal, resulting in a received symbol, which may be different from the transmitted symbol due to channel noise.

Symbol accumulator 804 accumulates the demodulated symbols until a threshold number of symbols have been received. The threshold number is set based on a likelihood that the number of symbols will include enough data to enable successful decoding of the symbols, resulting in the original binary information bits.

Figure 9:
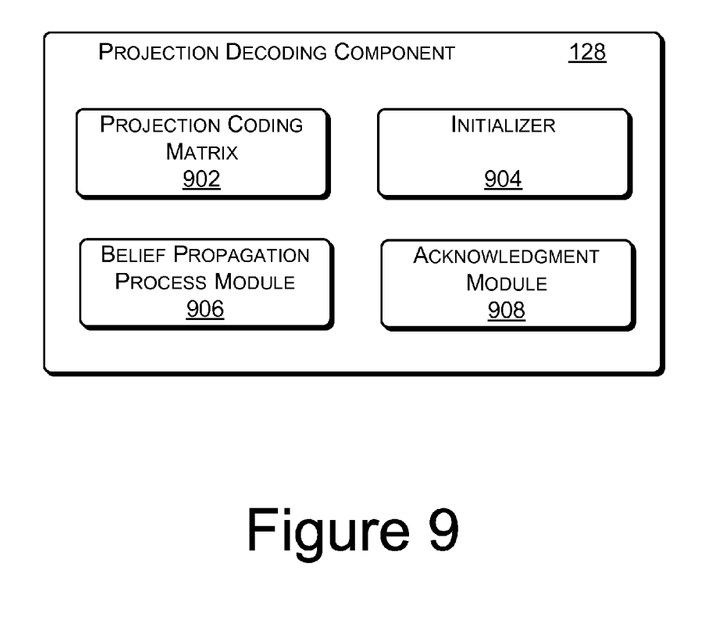
FIG. 9 is a block diagram that illustrates modules of an example projection decoding component.

FIG. 9 illustrates example modules of projection decoding component 128 including projection coding matrix 902, initializer 904, belief propagation process module 906, and acknowledgment module 908.

Projection coding matrix 902 corresponds to projection coding matrix 504, which is used by the transmitting device to encode the input bits. Projection coding matrix 902 is used by the projection decoding component 128 to decode the received symbols.

Initializer 904 sets initial probability values for each input bit to be either a 0 a 1. For example, in an implementation, initializer 904 sets the initial probability values to 0.5, indicating that the input bits are assumed to be random, meaning that a particular input bit has an equal probability of being 0 as it has probability of being 1. In an alternate example, transmitting device 102 provides receiving device 106 with information indicating the relative distribution of 0's and 1's in the input bits. For example if approximately 75% of the input bits are 1's, then initializer 904 sets initial probability values such that the probability of a particular input bit being 1 is equal to 0.75 and the probability of a particular input bit being 0 is equal to 0.25.

Belief propagation process module 906 iteratively analyzes the accumulated symbols and determines, for each received symbol, probabilistic values of the input bits that were combined to create the symbol.

Acknowledgment module 908 confirms that the received symbols have been properly decoded. In one implementation for determining whether the source bits are properly decoded, some CRC (cyclic redundant check) bits are included in the source bits. When it is determined that the received symbols have been properly decoded, acknowledgment module 908 sends an acknowledgment message to the transmitting device 102, signaling the transmitting device to stop sending symbols generated from the current set of input bits.

Figure 10:
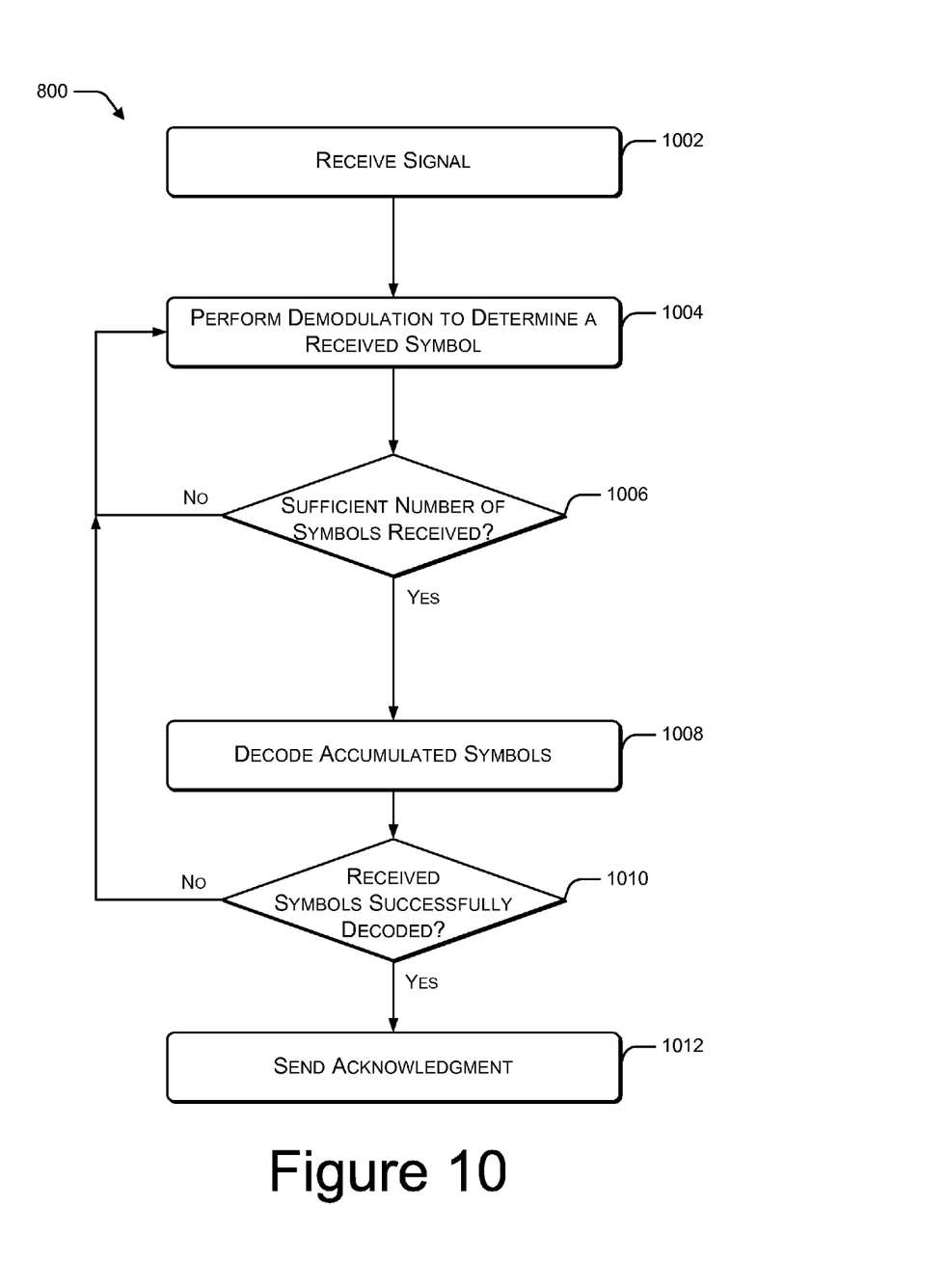
FIG. 10 illustrates an example process for demodulating and decoding a received data signal.

FIG. 10 illustrates an example process 1000 for demodulating and decoding a received data signal. This process is illustrated as a collection of blocks in a logical flow graph, which represents a sequence of operations that can be implemented in hardware, software, or a combination thereof. In the context of software, the blocks represent computer-executable instructions stored on one or more computer storage media that, when executed by one or more processors, cause the processors to perform the recited operations. Note that the order in which the process is described is not intended to be construed as a limitation, and any number of the described process blocks can be combined in any order to implement the process, or alternate processes. Additionally, individual blocks may be deleted from the processes without departing from the spirit and scope of the subject matter described herein. Furthermore, while this process is described with reference to the receiving device 106 described above with reference to FIGS. 1, 8, and 9, other computer architectures may implement one or more portions of this process, in whole or in part.

At block 1002, a modulated data signal is received. For example, as illustrated in FIG. 1, receiving device 106 receives a modulated data signal 114 over wireless network 104 that was sent by transmitting device 102.

At block 1004, receiving device 106 performs demodulation to determine a received symbol. For example, demodulator 802 demodulates the received signal, resulting in a symbol, which may be different from the symbol that was transmitted, due to channel noise.

When modulated data signal 114 is transmitted over wireless network 104, the amplitude of the signal is modified based on channel noise. The more noise on the channel, the more the signal is modified. Due to channel noise, the amplitude of the received signal, denoted $â_i$, is a noisy version of the amplitude of the signal that was transmitted, $a_i$. When a Gaussian channel is considered, $$â_i = a_i + e_i^c, e_i^c N(0, \sigma_c^2)$$

where $e_i^c$ is the Gaussian noise with variance $\sigma_c^2$. Accordingly, the received rateless symbol, $r_i$, corresponding to $s_i$ can be computed as:

$$r_i = s_{min} + \frac{s_{max} - s_{min}}{2A}(\hat{a}_i + A)$$

which reduces to:

$$r_i = s_i + \frac{s_{max} - s_{min}}{2A} e_i^c$$

where $e_i$ is the symbol noise with a value of:

$$e_i = \frac{s_{max} - s_{min}}{2A} e_i^c$$

Because $s_{max}$, $s_{min}$, and A are all constants for a given projection code design, $e_i$ is also a Gaussian variable, and its variance is given by:

$$\sigma^2 = \frac{s_{max} - s_{min}}{2A} \sigma_c^2$$

At block 1006, the receiving device determines whether or not a sufficient number of symbols have been received from the transmitting device. For example, symbol accumulator 804 collects the received symbols from demodulator 802. Depending on the specific projection code design, symbol accumulator 804 continues collecting symbols until a particular number of symbols has been accumulated before beginning the decoding process.

At block 1008, receiving device 106 decodes the symbols that have been received and accumulated. For example, projection decoding component 128 decodes the accumulated symbols.

Although a particular received symbol, $r_i$, may not belong to the encoding alphabet, S, the value of $r_i$ is, in most cases, in the range of $[s_{min}, s_{max}]$. Using this information, the receiving device decodes the received symbols into binary digits using maximum a posteriori estimation. Assuming M symbols are accumulated for decoding, the rateless decoding problem can be represented by:

$$\hat{x} = \arg\max_{x \in GF(2)^N} P(x | r_1, r_2, \ldots, r_M)$$

$$s.t.\ r = Cx^T + e$$

where $r = (r_1, r_2, \ldots, r_M)^T$ is the vector of received symbols, and $e = (e_1, e_2, \ldots, e_M)^T$ is the corresponding noise vector. C is an M×N projection coding matrix 902 in which each row is a projection vector as used by the transmitting device to encode the symbols.

The projection code that is used to encode binary digits into multilevel symbols can be represented by a bipartite graph, where left nodes are binary input and right nodes are encoded multilevel symbols. According to this structure, initializer 904 initializes the message sent by each input node $x_j$ to its connected symbol node $s_i$ as:

$$\begin{cases} u_{ji}^{(0)}(0) = P(x_j = 0) \\ u_{ji}^{(0)}(1) = P(x_j = 1) \end{cases}$$

With an initial assumption that the input bits are random, the probabilities $P(x_j=0)$ and $P(x_j=1)$ are equal. However, in an example implementation, the transmitting device notifies the receiving device of the distribution of 1's and 0's in the original data. $P(x_j=0)$ and $P(x_j=1)$ are initialized accordingly. Having this information is not necessary, but if it is available, the efficiency of the decoding process is increased.

As discussed above with reference to the encoding process, an encoded rateless symbol is the weighted sum of multiple input bits. When the encoded rateless symbol is transmitted, channel noise modifies the amplitude of the signal carrying the rateless symbol. Accordingly, a received rateless symbol $r_i$ can be expressed as:

$$r_i = w_1 x_{i_1} w_2 x_{i_2} + \ldots + w_L x_{i_L} e_i$$

If $j = i_l$ and $X_i = r_i - w_l x_j$, then the message sent from the i-th symbol node to the j-th variable node in the t-th iteration round is:

$$\begin{cases} v_{ij}^{(t)}(0) = P(x_j = 0 | r_i) = P(X_j = r_i) \\ v_{ij}^{(t)}(1) = P(x_j = 1 | r_i) = P(X_j = r_i - w_l) \end{cases}$$

The distribution of $X_j$ is the convolution product of the weighted distribution of every other variable node and $e_i$, given by:

$$P(X_j) = \left\{ \bigotimes_{i_k, 0 < k \le L, k \ne l} P(w_k x_{i_k}) \right\} \otimes P(e_i)$$

where the distribution of the weighted variable is:

$$\begin{cases} P(w_k x_{i_k} = 0) = u_{k_k i}^{(t-1)}(0) \\ P(w_k x_{i_k} = w_k) = u_{k_k i}^{(t-1)}(1) \end{cases}$$

The convolution is implemented through simple addition in the Fourier domain. The decoding algorithm is further simplified based on the knowledge that the input digits are binary. Based on this knowledge, the message sent by the j-th variable node to the i-th symbol node in iteration round t is:

$$\begin{cases} u_{ji}^{(t)}(0) = C_{ji} P(x_j = 0) \prod_{k \in T_j \setminus i} u_{kj}^{(t)}(0) \\ u_{ji}^{(t)}(1) = C_{ji} P(x_j = 1) \prod_{k \in T_j \setminus i} u_{kj}^{(t)}(1) \end{cases}$$

where $T_j$ is the index set of the symbol nodes connected with variable node j. If there is an edge between variable node j and symbol node i, then $i \in T_j$. $C_{ji}$ is a normalization constant which ensures:

$$u_{ji}^{(t)}(0) + u_{ji}^{(t)}(1) = 1$$

After T rounds of iteration, the belief propagation process stops and outputs the following posterior probabilities of the j-th variable node being 0 and 1:

$$\begin{cases} u_j^{(T)}(0) = C_j P(x_j = 0) \prod_{k \in T_j} u_{kj}^{(T)}(0) \\ u_j^{(T)}(1) = C_j P(x_j = 0) \prod_{k \in T_j} u_{kj}^{(T)}(1) \end{cases}$$

Then, the values of the input binary digits are estimated by:

$$x_j = \begin{cases} 0 & u_j^{(T)}(0) \geq u_j^{(T)}(1) \\ 1 & \text{otherwise} \end{cases}$$

At block 1010, projection decoding component 128 determines whether or not the received symbols have been successfully decoded. For example, based on the channel coding rate used to transmit the data, acknowledgment module 908 verifies the estimated values of the input binary digits against included redundancy data.

If acknowledgment module 908 determines that the received symbols have not been successfully decoded (the "No" branch from block 1010), then processing continues as described above with reference to block 1004 with additional symbols being received, demodulated, and accumulated.

On the other hand, if acknowledgment module 908 determines that the received symbols have been successfully decoded (the "Yes" branch from block 1010), then at block 1012, acknowledgment module 908 sends an acknowledgment message over wireless network 104 to transmitting device 102, signaling transmitting device 102 to stop sending symbols based on the current set of input bits.

A transmitting device implements compressive wireless modulation, as described herein, through projection coding and modulation using a dense QAM constellation. A projection code described herein generates symbols based on a weighted arithmetic sum of approximately random combinations of input bits. As described herein, QAM modulation is used, however, other types of digital modulation and analog modulation techniques, including, for example, PSK (phase-shift keying), FSK (frequency-shift keying), AM (amplitude modulation), PM (phase modulation), or FM (frequency modulation), may also be implemented to support compressive wireless modulation. Furthermore, alternate demodulation and decoding techniques may be used as appropriate, based on the specific encoding and modulation techniques that are implemented.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A compressive wireless modulation method that provides wireless link adaptation, the method comprising:
   under control of one or more processors configured with executable instructions:
   identifying a data signal having a set of binary source bits to be transmitted over a wireless network;
   computing weighted arithmetic sums of subsets of binary source bits from the set of binary source bits to generate rateless symbols;
   concatenating pairs of the rateless symbols to form constellation points; and
   modulating the data signal based on the constellation points according to a quadrature amplitude modulation scheme.

2. A method as recited in claim 1, wherein the weighted arithmetic sums are computed based on a symmetric weight set including both positive and negative weight values.

3. A method as recited in claim 1, wherein the weighted arithmetic sums are computed based on an integer weight set including only integer weight values.

4. A method as recited in claim 1, wherein the weighted arithmetic sums are computed based on a weight set, {−4, −4, −2, −1, 1, 2, 4, 4}.

5. The method as recited in claim 1, wherein computing weighted arithmetic sums of subsets of binary source bits from the set of binary source bits comprises:
   populating a two-dimensional projection coding matrix with elements from a set of weight values such that vectors along a first dimension of the two-dimensional projection coding matrix each include each weight value, with the remaining values set to zero, and such that distributions of the weight values across the vectors along the first dimension vary from one vector to another;
   populating a vector matrix with the set of binary source bits; and
   calculating an inner product of the two-dimensional projection coding matrix and the vector matrix.

6. A method as recited in claim 1, further comprising:
   transmitting the modulated data signal;
   receiving an acknowledgment indicating that a receiving device has successfully received and decoded the modulated data signal;
   in response to receiving the acknowledgment, ceasing the generating rateless symbols, forming constellation points, modulating data signals, and transmitting modulated data signals.

7. The method as recited in claim 1, wherein modulating the data signal comprises sequentially mapping the constellation points through a quadrature amplitude modulation (QAM) constellation to generate the modulated data signal.

8. One or more computer storage media encoded with computer-executable instructions that, when executed, configure a computer system to perform a method as recited in claim 1.

9. A system for compressive wireless modulation, the system comprising:
   a processor;
   a memory communicatively coupled to the processor;
   a projection coding component stored in the memory and executable on the processor to generate rateless multilevel symbols, wherein each rateless multilevel symbol comprises a combination of a plurality of binary input bits; and
   a modulation component stored in the memory and executable on the processor to:
   concatenate a plurality of the rateless multilevel symbols to generate constellation points;
   map the constellation points through a quadrature amplitude modulation (QAM) constellation to generate a modulated data signal; and transmit the modulated data signal over a wireless network, wherein the combination of the plurality of binary input bits comprises a weighted arithmetic sum of a combination of a subset of the binary input bits.

10. A system as recited in claim 9, wherein each rateless multilevel symbol comprises an approximately random combination of the plurality of binary input bits.

11. A system as recited in claim 9, wherein the projection coding component comprises:
   a projection code matrix that includes approximately random distributions of weight values;
   a source matrix that includes the plurality of binary input bits; and
   a matrix multiplication module configured to calculate the inner product of the projection code matrix and the source matrix to generate the rateless multilevel symbols.

12. A system as recited in claim 11, wherein the projection code matrix is a low density two-dimensional matrix wherein most elements of the projection code matrix have a value of zero and wherein each non-zero element of the projection code matrix is an element of a set of weight values.

13. A system as recited in claim 11, wherein the source matrix comprises a vector matrix.

14. A system as recited in claim 9, wherein the QAM constellation comprises a square constellation.

15. A system for compressive wireless modulation, the system comprising:
   a processor;
   a memory communicatively coupled to the processor;
   a projection coding component stored in the memory and executable on the processor to generate rateless multilevel symbols, wherein each rateless multilevel symbol comprises a combination of a plurality of binary input bits, the projection coding component comprises:
   a projection code matrix that includes approximately random distributions of weight values;
   a source matrix that includes the plurality of binary input bits; and
   a matrix multiplication module configured to calculate the inner product of the projection code matrix and the source matrix to generate the rateless multilevel symbols; and
   a modulation component stored in the memory and executable on the processor to:
   concatenate a plurality of the rateless multilevel symbols to generate constellation points;
   map the constellation points through a quadrature amplitude modulation (QAM) constellation to generate a modulated data signal; and
   transmit the modulated data signal over a wireless network.

* * * * *